US009586282B2

(12) United States Patent
Yang

(10) Patent No.: US 9,586,282 B2
(45) Date of Patent: Mar. 7, 2017

(54) WELDING A JOINT

(71) Applicant: GM Global Technology Operations LLC, Detroit, MI (US)

(72) Inventor: David Yang, Shanghai (CN)

(73) Assignee: GM Global Technology Operations LLC, Detroit, MI (US)

(*) Notice: Subject to any disclaimer, the term of this patent is extended or adjusted under 35 U.S.C. 154(b) by 280 days.

(21) Appl. No.: 13/797,604

(22) Filed: Mar. 12, 2013

(65) Prior Publication Data
US 2014/0144893 A1    May 29, 2014

(30) Foreign Application Priority Data

Nov. 23, 2012  (CN) .......................... 2012 1 0480850

(51) Int. Cl.
| B23K 26/00 | (2014.01) |
| B23K 9/00 | (2006.01) |
| B23K 15/00 | (2006.01) |
| B23K 26/32 | (2014.01) |

(52) U.S. Cl.
CPC ........ B23K 9/0026 (2013.01); B23K 15/0093 (2013.01); B23K 26/142 (2015.10); B23K 26/322 (2013.01); *B23K 2201/34* (2013.01)

(58) Field of Classification Search
CPC ...... B23K 26/00; B23K 26/32; B23K 26/123; B23K 26/147
USPC .............. 219/121.6, 121.61, 121.62, 121.64, 219/121.65, 121.66
See application file for complete search history.

(56) References Cited

U.S. PATENT DOCUMENTS

| 4,634,832 A * | 1/1987 | Martyr ............... | B23K 26/0643 219/121.63 |
| 4,990,741 A * | 2/1991 | Moores ............... | B23K 26/0738 219/121.64 |
| 5,160,822 A * | 11/1992 | Aleshin .................... | F01D 5/20 219/121.64 |
| 5,187,346 A * | 2/1993 | Bilge .................... | B23K 26/32 219/121.64 |
| 5,430,270 A * | 7/1995 | Findlan ................ | B23K 26/106 219/121.63 |

(Continued)

OTHER PUBLICATIONS

Laslau, Ramona, et al., "Laser Beam Defocusing Effects on Laser Welds Surfaces", International Conference of Scientific Paper Afases 2011, Brasov, May 26-28, 2011, pp. 901-906.

(Continued)

*Primary Examiner* — Dana Ross
*Assistant Examiner* — Ayub Maye
(74) *Attorney, Agent, or Firm* — Dierker & Kavanaugh, P.C.

(57) ABSTRACT

Methods for welding a joint are disclosed herein. One example of the method involves welding the joint between two workpieces. Energy is focused onto the joint to weld the joint. The focus of the energy moves relative to the joint. A vaporized material is displaced from a keyhole created by the welding. The vaporized material is vaporized by the energy. A pool of molten material is formed adjacent the keyhole during operation of the energy at the joint. The pool of molten material is manipulated by displacing a portion of the molten material from a near end of the pool and from lateral sides of the pool to a far end of the pool. The far end of the pool is distal to the near end.

10 Claims, 7 Drawing Sheets

(56) References Cited

U.S. PATENT DOCUMENTS

| | | | |
|---|---|---|---|
| 5,500,503 A * | 3/1996 | Pernicka | B23K 26/24 |
| | | | 219/121.63 |
| 5,502,292 A * | 3/1996 | Pernicka | B23K 26/24 |
| | | | 219/121.63 |
| 5,618,452 A * | 4/1997 | Matubara | B23K 26/123 |
| | | | 219/121.63 |
| 5,700,989 A * | 12/1997 | Dykhno et al. | 219/121.45 |
| 5,705,785 A * | 1/1998 | Dykhno et al. | 219/121.45 |
| 6,388,227 B1 * | 5/2002 | Dykhno et al. | 219/121.6 |
| 6,608,278 B1 * | 8/2003 | Xie | B23K 26/0608 |
| | | | 219/121.64 |
| 6,797,914 B2 | 9/2004 | Speranza et al. | |
| 6,914,213 B2 * | 7/2005 | Alips et al. | 219/121.64 |
| 7,138,598 B2 | 11/2006 | Stevenson et al. | |
| 7,154,064 B2 | 12/2006 | Wang et al. | |
| 8,253,060 B2 * | 8/2012 | Nowak et al. | 219/121.63 |
| 2001/0023527 A1 * | 9/2001 | Beyer | B23K 9/00 |
| | | | 29/527.7 |
| 2007/0015671 A1 * | 1/2007 | Naumovski | C10M 169/04 |
| | | | 508/150 |
| 2009/0134132 A1 * | 5/2009 | Verna | B23K 26/1476 |
| | | | 219/121.64 |
| 2010/0282723 A1 | 11/2010 | Chouf et al. | |
| 2011/0094673 A1 * | 4/2011 | Daly | B29C 65/1635 |
| | | | 156/272.8 |
| 2011/0206940 A1 * | 8/2011 | Engert | B23K 37/00 |
| | | | 428/600 |
| 2012/0000892 A1 * | 1/2012 | Nowak et al. | 219/121.64 |
| 2013/0232749 A1 * | 9/2013 | Bruck | B23K 9/042 |
| | | | 29/402.01 |

OTHER PUBLICATIONS

Chen, Kai, et al., "Gas Jet-Workpiece Interactions in Laser Machining", Journal of Manufacturing Science and Engineering, Aug. 2000, vol. 122, pp. 429-438.

Yang, S., et al., "Laser Welding of High-Strength Galvanized Steels in a Gap-Free Lap Joint Configuration under Different Shielding Conditions", Welding Research, Jan. 2011, vol. 90, pp. 8-s-18-s.

* cited by examiner

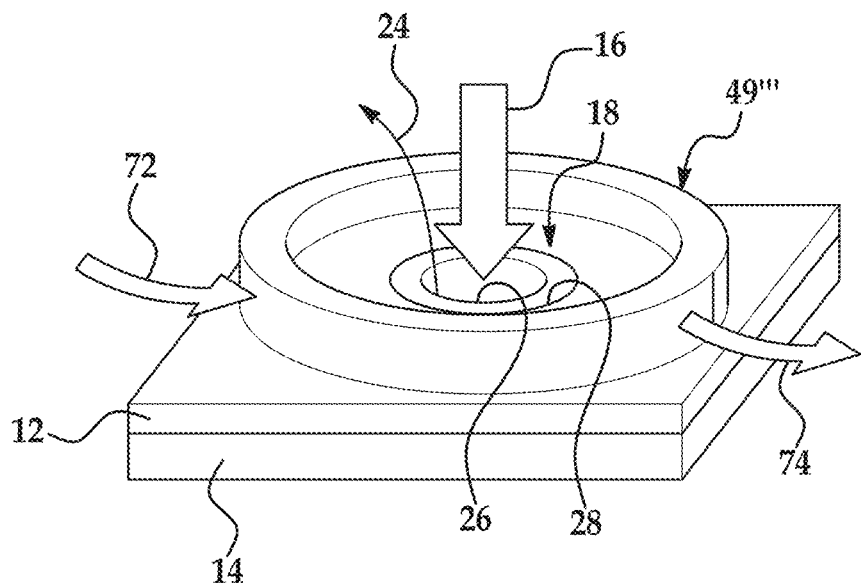
FIG. 8
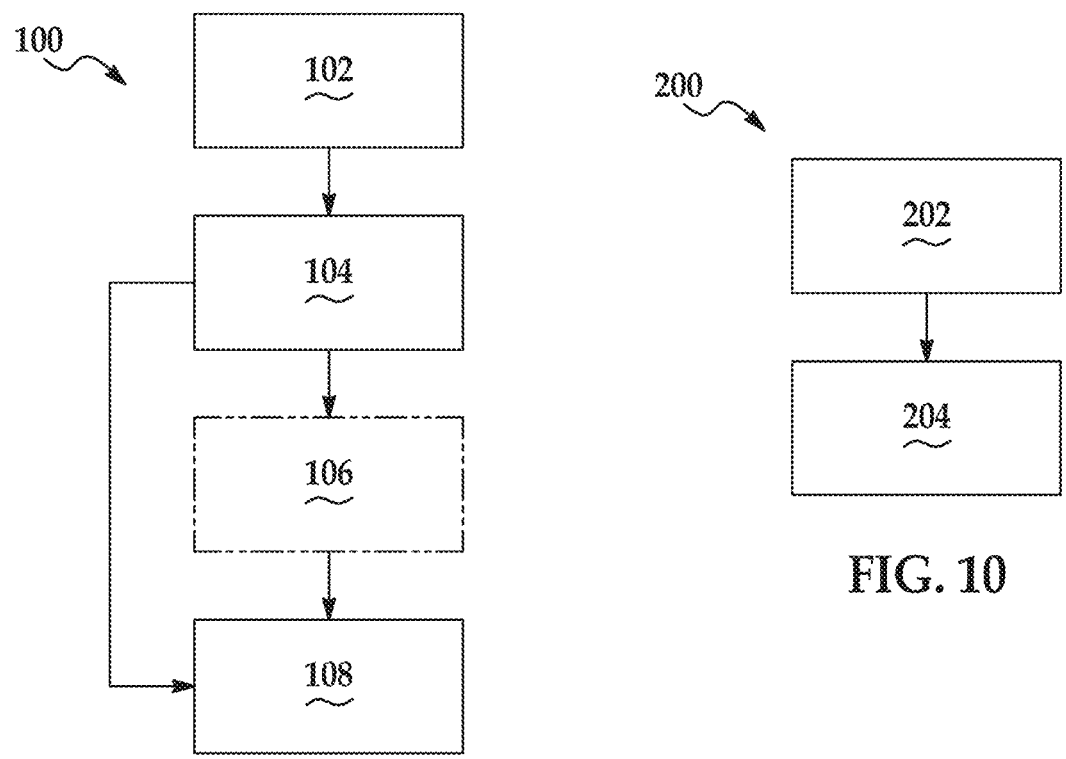
FIG. 9
FIG. 10

WELDING A JOINT

CROSS-REFERENCE TO RELATED APPLICATIONS

This application is based on and claims the benefit of priority from Chinese Patent Application No. 201210480850.7, filed on Nov. 23, 2012, the contents of which are incorporated by reference herein.

TECHNICAL FIELD

The present disclosure relates generally to methods for welding a joint.

BACKGROUND

The automotive industry utilizes a variety of materials, including coated steels, for a variety of different parts. As an example, zinc coated steel is often utilized because of its corrosion resistance. While coated materials are often desirable because of their properties, the welding of these materials may present one or more challenges, especially when attempting to create a lap joint.

SUMMARY

Methods of welding a joint are disclosed herein. One example of the method involves welding a joint between two workpieces. The method includes focusing energy onto the joint to weld the joint. The focus of the energy moves relative to the joint. The method further includes displacing a vaporized material from a keyhole created by the welding. The vaporized material is vaporized by the energy. A pool of molten material is formed adjacent the keyhole during operation of the energy on the joint. The method also involves manipulating the pool of molten material by displacing a portion of the molten material from a near end of the pool and from lateral sides of the pool to a far end of the pool. The far end of the pool is distal to the near end.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 8 is a schematic, perspective view of an example of a water rapid cooling system that may be utilized in an example of the welding with cooling method;

FIG. 9 is a flow diagram representing an example of the welding method disclosed herein;

FIG. 10 is a flow diagram representing an example of the welding with cooling method disclosed herein;

DETAILED DESCRIPTION

Figure 1A:
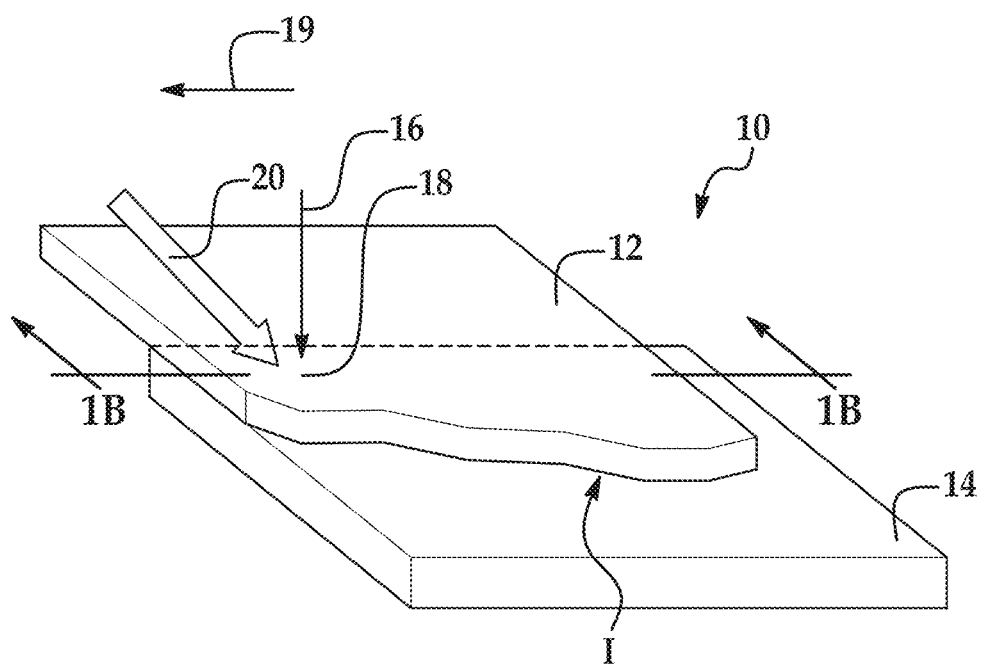
FIG. 1A is a schematic, perspective view of an example of a joint according to the present disclosure.

Welding has been used to create a variety of different joint configurations between two or more workpieces. Examples of the joint configuration include lap joint configurations, such as a gap free lap joint configuration. It has been found, however, that various problems may be encountered during the formation of some lap joints due, at least in part, to surface coatings that are present on one or both surfaces of the workpiece(s) or to low boiling elements/components that are present in one or both of the workpiece(s). In particular, it has been found that defects in lap joints often result when, for example, i) the surface(s) of the workpiece(s) is/are coated with a coating that has a lower boiling point than a melting point of the base material of the workpiece(s), or ii) when the workpiece(s) includes an element/component that has a lower boiling point than a melting point of the main element of the workpiece(s). An example of this type of coating is a zinc coating, which may be used to improve the corrosion resistance of steel. For example, a zinc coated steel sheet may be formed into a body panel for an automobile by welding in a lap joint configuration. During welding, the steel substrate of each of the steel sheets is melted at the weld. Since the zinc coating boils/vaporizes at a lower temperature than the melting point of the steel substrate, zinc vapor may mix with the molten steel. Vapor in the molten pool may become highly pressurized and may create weld discontinuities, for example by displacing liquid metal out of a molten pool of weld material, which may lead to the formation of spatter, blowholes, porosity, drop-out, undercut, etc.

Some examples of the welding methods disclosed herein enable the rapid release of undesirable vapors produced during the welding method. In these examples, a negative pressure zone is created directly above a molten pool by passing a high pressure air flow (e.g., greater than 1 atm) through a specific nozzle. This method enlarges a keyhole (using the air flow), which provides a channel for the vapors to escape from the molten pool. Other examples of the welding methods disclosed herein utilize cooling to reduce the temperature of the workpiece(s), and thus reduce a pressure level of the undesirable vapors produced during the welding method. In these examples, the vapor pressure level is reduced and thus can be balanced by the surface tension from the liquid metal. Under these conditions, the keyhole is stabilized and thus provides a channel for the vapors to escape from the workpiece(s).

Furthermore, the method(s) disclosed herein generate the lap joints without creating a gap between layers of the lap joint. While gaps may allow undesirable vapors to vent away from the molten material during welding, generation of the gap may increase the production cycle time and costs. Further, the presence of the gap between the layers may lead to a higher potential for corrosion. The examples disclosed herein advantageously avoid gap formation (i.e., the lap joints are gap free), and thus avoid these potential problems.

It is believed that examples of the methods according to the present disclosure improve weld quality, reduce cost, and shorten cycle times for various workpiece materials including a constituent material with a lower boiling point than the melting point of a base/bulk material from which the workpiece is made. The constituent material may either be deposited as a coating on the base/bulk material or included as a minor or secondary component in the base/bulk material. Examples of these workpiece materials include zinc coated steels (of which steel is the base/bulk material and zinc is the constituent material), aluminum alloys (of which aluminum is the base/bulk material and the alloyed material, e.g., Zn, Mg, etc., is the constituent material), copper alloys (of which copper is the base/bulk material and the alloyed material, e.g., Zn, is the constituent material), magnesium alloys (of which magnesium is the base/bulk material and the alloyed material, Zn, is the constituent material), zinc alloys (of which zinc is the base/bulk material and the alloyed material, e.g., Al, Cu, etc. is the constituent material), polymers coated with or including the constituent material, laminated steels, and press-hardening steels.

While two workpieces 12 and 14 are shown in some of the figures, it is to be understood that more than two workpieces 12, 14 may be joined together by the welding methods disclosed herein. As such, a multi-layer stacked configuration may be used in which more than two workpieces are joined together. Additionally, the workpieces 12 and 14 may be in the form of sheet materials.

Figure 1B:
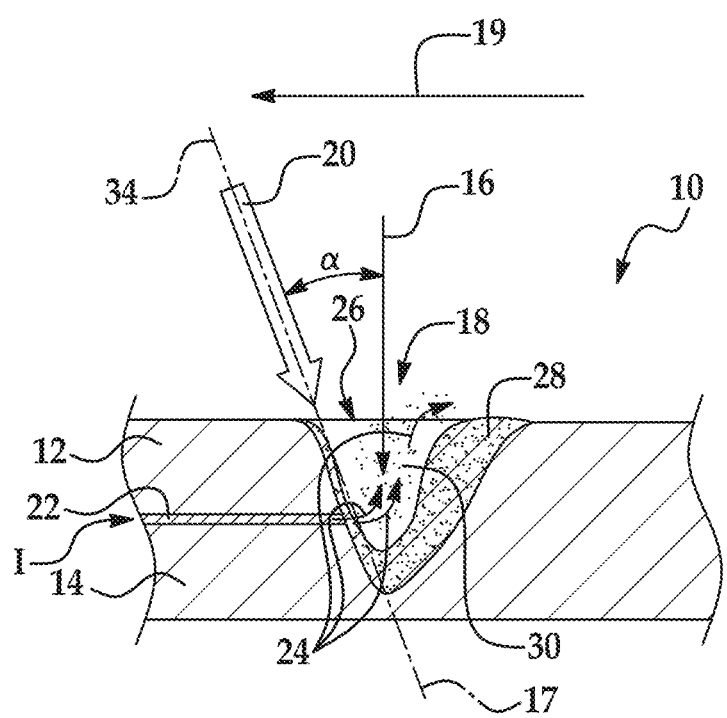
FIG. 1B is a cross-sectional schematic view of the joint taken along the 1B-1B line of FIG. 1A.

Referring now to FIGS. 1A and 1B, an example of welding a joint is depicted generally at 10. In this example, a first workpiece 12 and a second workpiece 14 are shown in a gap free lap joint configuration. The workpieces 12, 14 in this configuration are overlapping and in direct contact with one another (i.e., the workpieces 12, 14 are in a gap free configuration or no gap exists between the workpieces 12, 14). In an example, workpieces 12, 14 in a gap free configuration may be clamped together in a fixturing device (not shown) to hold the workpieces 12, 14 in the desired configuration for welding.

One or both of the workpieces 12, 14 may include the constituent material 22 (see FIG. 1B) disposed in the joint (i.e., at the interface I) between the workpieces 12, 14. In other examples, one or both of the workpieces 12, 14 may include the constituent material 22 as a coating on the surface that is opposed to the surface at the interface I between the workpieces 12, 14. In still other examples, one or both of the workpieces 12, 14 may include the constituent material 22 as a coating on both the surface at the interface I and the surface that is opposed to the interface I. In yet other examples, one or both of the workpieces 12, 14 may include the constituent material 22 within the base/bulk material of the workpiece 12, 14. As previously mentioned, the constituent material 22 generally has a lower boiling point than the melting point of the base/bulk material from which the workpiece(s) 12, 14 is/are formed.

As shown in FIGS. 1A and 1B, during the welding process, energy 16 is focused onto the gap free lap joint at a weld site 18. It is to be understood that the energy 16 may be applied from any of a laser beam (from, e.g., a Nd:YAG, neodymium-doped yttrium aluminum garnet or $Nd:Y_3Al_5O_{12}$, laser, a $CO_2$ laser, a fiber laser, a disk laser, a diode laser, etc.), an electron beam, and an arc (e.g., gas tungsten arc welding, plasma arc welding, etc.).

Heat may also be applied to the weld site 18. The heat may be from the energy 16, or may be applied in addition to the energy 16. Suitable heat sources may be any of the energy sources listed above.

In a welding operation, a source of the energy 16 and/or the overlapping workpieces 12, 14 is/are moved relative to one another in a weld direction (an example of which is identified by an arrow designated 19 in FIGS. 1A and 1B). As such, during welding, the weld site 18 advances across the workpieces 12, 14 in the weld direction 19 in order to create the welded gap free lap joint. In an example, the energy 16 may be moved across the workpieces 12, 14 in the weld direction 19 by adjusting (e.g., repositioning) the source of the energy 16 along the weld direction 19 while keeping the workpieces 12, 14 stationary. In another example, the energy 16 may be moved across the workpieces 12, 14 in the weld direction 19 by maintaining the position of the source of the energy 16 while moving the workpieces 12, 14 along the weld direction 19. In still another example, the energy 16 may be moved across the workpieces 12, 14 in the weld direction by moving both the source of the energy 16 and the workpieces 12, 14 in a coordinated manner. For example, the source of the energy 16 may be moved in the weld direction 19 while the workpieces 12, 14 are simultaneously moved in a direction opposite of the weld direction 19.

As shown in FIG. 1B, a pool 28 of molten material may be formed in the weld site 18 by the energy 16. An opening in the pool 28 of molten material defines a keyhole 26 that is bound by a free surface of the pool 28. The keyhole 26 descends from a surface of the workpiece 12 closest to the energy 16 toward and through the interfacing surfaces of workpieces 12 and 14 as the energy 16 melts the workpieces 12 and 14. When the energy 16 is a laser beam, a laser-induced plasma 30 may be formed in the keyhole 26 by the ionization of the material(s) in the joint.

Figure 2:
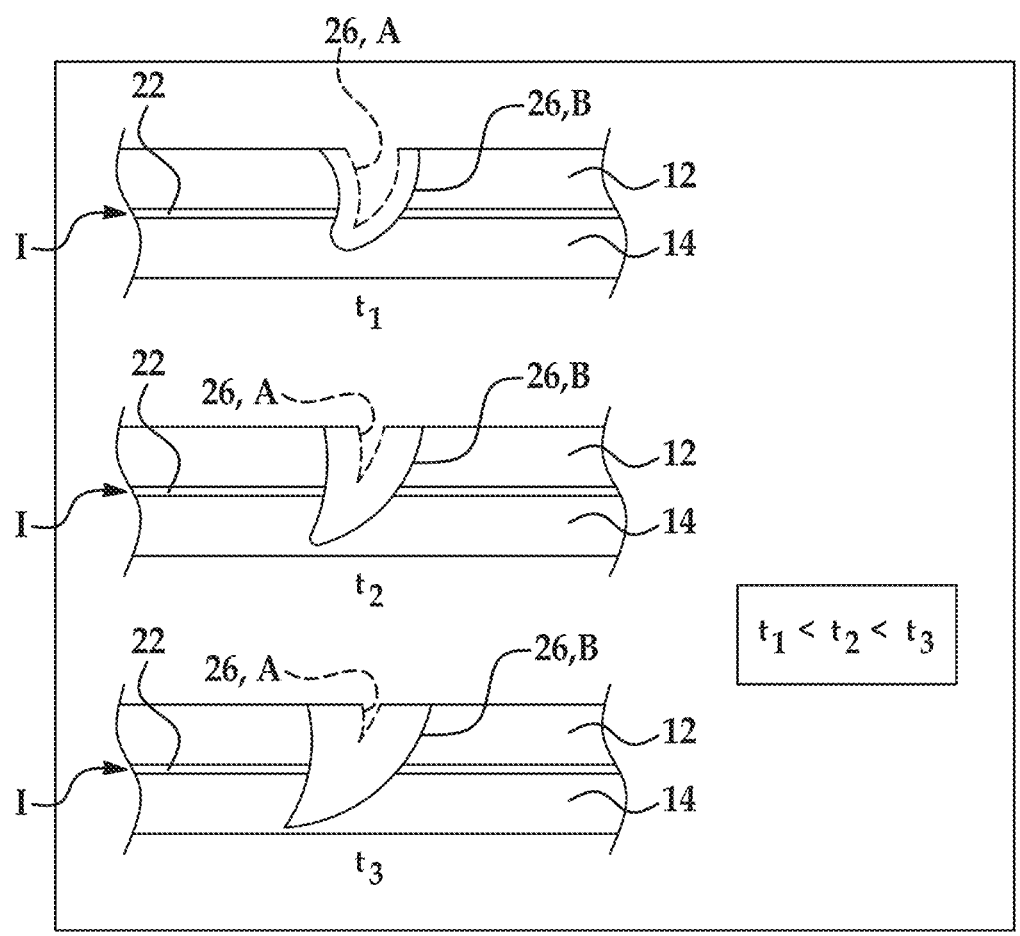
FIG. 2 is a schematic diagram depicting a time-lapse view of examples of keyholes in joint welding areas formed by conventional welding and formed by an example of a welding method according to the present disclosure.

Referring briefly to FIG. 2, example keyholes 26 are shown schematically both for a traditional welding process and for a welding process according to some examples of the present disclosure. The keyholes 26 formed via the traditional welding process are shown by the dashed line 26, A, and the keyholes 26 formed via some examples of the present disclosure are shown by the solid line 26, B. The formation of the keyholes 26, A and 26, B is shown as time progresses from time $t_1$ (earliest of the times), to time $t_2$, to time $t_3$ (latest of the times). As shown in FIG. 2, keyhole 26, B is enlarged as the welding process and time progress. As will be discussed further herein, in order to enlarge the keyhole 26, B, a gas is directed toward the keyhole 26, B in a specific manner. In addition to physically moving the molten material to enlarge the keyhole 26, B, the delivery of the gas creates an external pressure over the pool 28 and the keyhole 26, B. This external pressure balances a shear force from the highly pressurized undesirable vapors as well as the surface tension from the molten pool 28, which in turn stabilizes the molten pool 28. The enlarged keyhole 26, B surrounded by the stabilized pool 28 of molten material provides an open channel for the undesirable vapors to escape. In contrast, during a traditional welding process, keyhole 26, A has a tendency to close/disappear or fail to reach the interface I of the workpieces 12, 14. This may be due, at least in part, to the surface tension on the keyhole surface and/or to the energy intensity falling below a threshold value due to energy reflecting off of an inclined molten pool surface. It is to be understood that the keyhole 26, A in traditional welding processes may fluctuate over time during a welding operation.

Referring back to FIG. 1B, during one example of the welding process disclosed herein, the constituent material 22 boils/vaporizes to generate vapors (i.e., vaporized material 24). As discussed above, the vaporized material 24 is formed as a result of the constituent material 22 having a lower boiling point than the melting point of the base/bulk material from which the workpiece(s) 12, 14 is/are formed.

The method illustrated in FIG. 1B involves the application of a gas jet 20 to the pool 28 of molten material. The gas jet 20 is similar to an air-knife that is used in a specific manner, and thus may be said to perform semi-cutting during the welding process. In particular, the gas jet 20 semi-cuts through the workpiece 12 and the interface I, and also manipulates the molten material in the pool 28 to enlarge the keyhole 26 (as shown in FIG. 2) and stabilize the molten material pool 28 (as previously described in reference to FIG. 2). As briefly discussed above in reference to FIG. 2, the gas jet 20 delivered to the pool 28 manipulates the pool 28 by displacing a portion of the molten material from a near end of the pool 28 and from lateral sides of the pool 28 to a far end of the pool 28. The far end of the pool 28 is distal to the near end of the pool 28, where the near end of the pool 28 is the end that is closest to the keyhole 26. In other words, the molten material is pushed outward from a center of the keyhole 26, and thus the keyhole 16 becomes enlarged. The enlarged keyhole 26 provides a channel for the vaporized material 24 to escape from the workpieces 12, 14.

When the laser beam is utilized as the energy 16, the application of the gas jet 20 may also displace the laser-induced plasma 30. Displacing the laser-induced plasma 30 also helps to enlarge the keyhole 26. It is to be understood that the displacement of the laser-induced plasma 30 also helps to increase the coupling of the laser beam energy into the workpieces 12, 14, which also contributes to enlarging the keyhole 26.

The gas jet 20 may be applied continuously throughout this example of the welding process. As such, the external force that balances the force of the vaporized material 24 exists throughout the welding process. This maintains the enlarged keyhole 26 and the stabilized molten material pool 28, and thus continuously provides the channel in order to accelerate the escape of the vaporized material 24. The gas jet 20 and the application of the gas jet 20 during the welding process will be further described in reference to FIGS. 3A, 3B and 4.

Figure 3A:
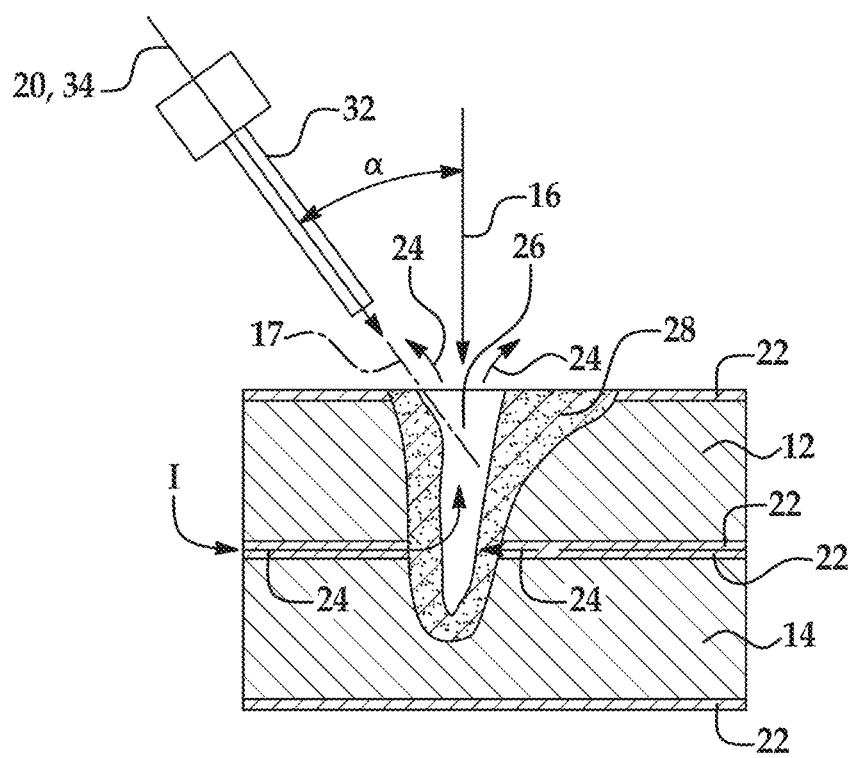
FIG. 3A is a schematic, partially cross-sectional view of an example of the welding method according to the present disclosure.

Referring specifically to FIG. 3A, the constituent material 22 is shown positioned as a coating on an upper surface and a lower surface of each of workpiece 12 and workpiece 14 (i.e., on the internal and external surfaces relative to the weld joint). Any of the materials previously described for the workpieces 12, 14 and the constituent material 22 may be used in this example.

In the examples shown and described in reference to FIGS. 1 through 4, it is to be understood that the gas jet 20 may include argon, helium, nitrogen, carbon dioxide, oxygen, air, and combinations thereof.

The gas jet 20 is applied using a nozzle 32. The nozzle 32 is capable of delivering the gas jet 20 straight into the keyhole 26, and is also capable of maintaining the constant pressure level in order to avoid turbulence in the molten material pool 28 (i.e., to stabilize the pool 28). The nozzle 32 delivers the gas jet 20 along a nozzle axis 34 (and therefore a flow axis) at an angle $\alpha$ (also shown in FIG. 1B, and referred to herein as the nozzle angle) that is defined from a line that is parallel to a direction of the energy 16. Nozzle angle $\alpha$ may range from about 0 degrees to about 90 degrees. The nozzle axis 34 may be coincident with a leading axis 17 of the keyhole 26. For example, in FIG. 1B, the leading axis 17 of the keyhole 26 approximately lines up with the primary axis of gas jet 20 and the nozzle axis 34. Similarly in FIG. 3A, the keyhole 26 leading edge approximately lines up with the nozzle axis 34.

The desired delivery of the gas flow and the desired maintenance of the pressure level may be achieved when the nozzle 32 is relatively long and includes relatively small inlet and outlet orifices. An example of this nozzle 32 will now be described in reference to FIG. 4.

Each of the inlet and outlet orifices 40, 42 has a respective equivalent diameter ranging from about 0.1 mm to about 200 mm, which may vary depending upon the power of the energy 16, the welding speed, and the thickness of the workpieces 12, 14. In this context, "the equivalent diameter" is a diameter of a shape that gives the same pressure loss as a different shape. For example, diameter X for a particular circular inlet orifice 40 corresponds to a diameter Y for a particular rectangular outlet orifice 42, wherein the inlet orifice 40 has the same pressure loss as the outlet orifice 42. In the examples disclosed herein, the orifices 40, 42 of the nozzle 32 may have any shape and/or diameter so long as the gas flows through the nozzle 32 in the same manner as the gas would flow through a circular nozzle having a diameter ranging from about 0.1 mm to about 200 mm. As such, in some instances, the shape and diameter of the nozzle from one orifice 40 to the other orifice 42 are the same (e.g., the nozzle 32 is not a converging nozzle or a diverging nozzle). In other instances, the shapes and/or the diameters of the orifices 40 42 are different (e.g., the inlet is circular and the outlet is rectangular). Other suitable shapes include oval, square, etc.

Figure 4:
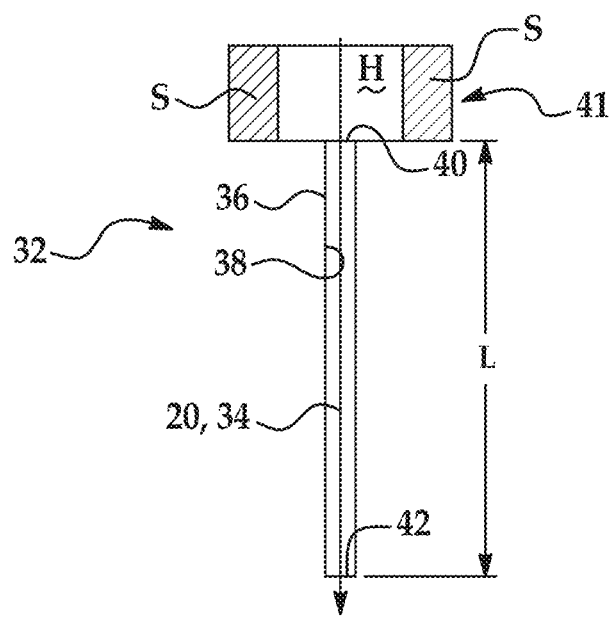
FIG. 4 is a schematic, partially cross-sectional view of an example of a nozzle according to the present disclosure.

In the example shown in FIG. 4, the inlet and outlet orifices 40, 42 have the same shape and diameter. More particularly, the inlet and outlet orifices 40, 42 are circular and are defined in opposed ends of a cylindrical conduit 36 that is formed by a nozzle wall 38. The nozzle wall 38 may be, for example, a copper alloy. In this example, the diameter of each of the orifices 40, 42 is the same as the diameter of the cylindrical conduit 26, which is consistent throughout the axial length L of the cylindrical conduit 36. In this particular example, the diameter of the nozzle 32 ranges from about 0.2 mm to about 6 mm, and the axial length L ranges from about 1 mm to about 200 mm. As a specific example, the diameter is about 1.2 mm and the axial length L is about 26 mm.

As depicted, the nozzle 32 may be attached to other component(s) (e.g., component 41), which may enable the nozzle 32 to be connected to a source of the gas. The component 41 may include a hollow portion H that is in fluid (e.g., gas) communication with the orifice 40. The hollow portion H may be defined by a solid portion S. The shape and dimensions of the component 41 may be varied as desired. In one example, the component 41 is cylindrical, where a diameter of the solid portion is about 15 mm and the diameter of the hollow portion H is about 8 mm.

The gas jet 20 is applied to the pool 28 of molten material from a stand-off distance. The stand-off distance is defined as the distance from the end of the nozzle 32 (i.e., at orifice 42, from which the gas jet 20 is ejected) to the weld site 18. The stand-off distance may range from about 1 mm to about 100 mm. In an example, the stand-off distance is about 6 mm. This and larger stand-off distances are relatively large (e.g., compared to a traditional laser cutting processes), and is suitable for the methods disclosed herein, at least in part, because of the long small nozzle 32 that is used to apply the gas jet 20. The nozzle 32 may be axially installed. When the nozzle 32 is axially installed, the stand-off distance may be larger than 1 mm and the nozzle diameter(s) may be larger than 2 mm. The stand-off distance may influence the flow patterns of the gas jet 20 as well as contribute to controlling the external pressure that is exerted on the molten pool 28 and keyhole 26. As an example, the stand-off distance may contribute to an external force that is large enough to stabilize the molten pool 28 without causing the removal of the molten material from the pool 28. While example stand-off distances are provided herein, it is to be understood that the stand-off distance may be varied to adjust welding speed and quality for a given laser power.

Variation in the leading axis 17 of the keyhole 26 may have a dependency on a weld speed. As an example, the leading axis 17 of the keyhole 26 may be increased with an increase in the welding speed. In some examples, the welding speed may be selected for a given nozzle angle $\alpha$ (and thus angle of the leading axis 17) and a given laser power. It may be desirable for the nozzle angle $\alpha$ to correspond with the angle of the leading axis 17 of the keyhole 26 (e.g., the angles are the same number of degrees, and extend in the same direction (x or −x) or extend in opposite directions (x, −x) from the line parallel to the direction of the energy 16) in order to direct the gas jet 20 in a manner that enlarges the keyhole 26 and does not deleteriously impact the molten material pool 28. The angle of the leading axis 17 of the keyhole 26 may be determined by X-ray videography or may be determined from a cross-section of the weld zone (e.g., a cross-section taken through the workpieces 12, 14 along the weld direction). In an example, the nozzle angle $\alpha$ ranges from about 30° to about 90° for a laser power larger than 2 kW, a welding speed larger than 1 m/min, and a workpiece thickness greater than 0.5 mm.

The weld or welding speed is defined as the rate of advancement of the weld site 18 in the weld direction 19 along the workpieces 12, 14. Example welding speeds may range from about 0.5 m/min to about 60 m/min. In specific examples, the welding speed may range from about 1 m/min to about 8 m/min or from about 6 m/min to about 7 m/min. In still another specific example, the welding speed may range from about 1 m/min to about 8 m/min on workpieces 12, 14 having respective thicknesses of about 2 mm each while using a laser with 4 kW power and a laser spot of about 0.6 mm. In examples, laser power may range from about 1 kW to about 10 kW. In one example, a laser with 3.2 kW power is used at a weld speed of about 3 m/min when the workpieces 12, 14 have thicknesses of about 1.6 mm each.

The gas jet 20 is applied at a flow rate ranging, for example, from about 0.01 L/min to about 100 L/min. In other examples, the flow rate may range from about 0.01 L/min to about 3 L/min. The flow rate may be determined in response to a linear energy, the gas jet (i.e., nozzle) angle $\alpha$, the welding speed, the stand-off distance, and/or an energy angle (i.e., the angle at which the energy 16 is directed toward the workpieces 12, 14). It is to be understood that flow rates herein are described at STP (standard temperature and pressure). In an example, the laser power is larger than 1 kW, the welding speed is larger than 1 m/min, and the flow rate ranges from about 3 SCFH to about 60 SCFH (i.e., about 1.42 L/min to about 28.32 L/min).

The maximum linear energy as used in this context is defined as an approximate energy level limit, or threshold value, at or below which the amount of vaporized material 24 produced can be balanced using the method described herein in reference to FIGS. 1 through 4. Above the threshold value, it is believed that the amount of vaporized material 24 at high pressure cannot be balanced by the pool 28 of molten material. The maximum linear energy may vary with different workpiece thicknesses. In examples, the maximum linear energy for 1.5 mm to 1.5 mm weldments is 1000 W/m/min, and the maximum linear energy for 0.7 mm to 0.7 mm weldments is 600 W/m/min.

As previously mentioned, the gas jet 20 generates the external pressure that balances the pressure of the vaporized material 24 and stabilizes the molten material pool 28. The external pressure that is generated may range from about 1 atm to about 60 atm (gage pressure).

Figure 3B:
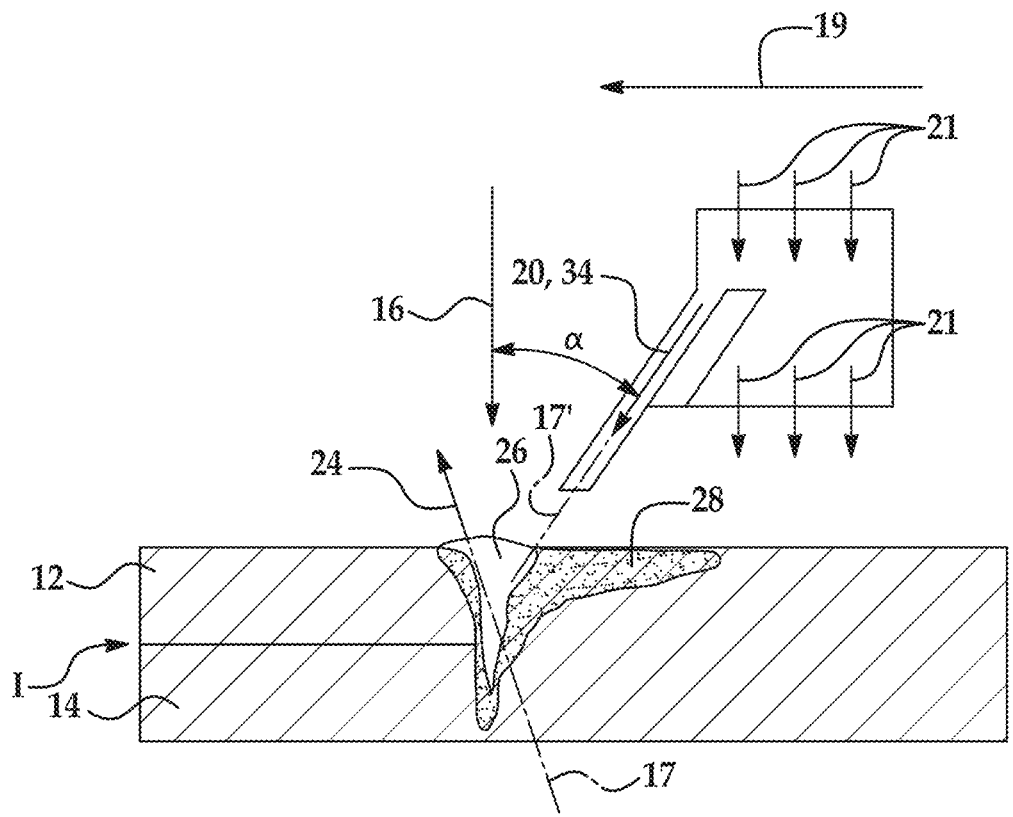
FIG. 3B is a schematic, partially cross-sectional view of another example of the welding method according to the present disclosure.

As shown in FIG. 3B, it is to be understood that in another example of this method, the nozzle axis 34 and the gas jet 20 may be configured so that the gas jet 20 is applied to the leading axis 17 of the keyhole 26. It is to be understood that in this example, the nozzle axis 34 may be aligned with a trailing axis 17' of the keyhole 26, which is located generally along an opposite surface of the keyhole 26 from the leading axis 17. In this example, the gas jet 20 moves the molten material in the pool 28 in a desirable manner in order to enlarge the keyhole 26. In this example, additional gas flow 21 may also be directed to the portions of the workpieces 12, 14 that have already been welded. A cooling effect may be realized by applying the gas flow 21 to the workpieces 12, 14 behind the weld location. It is to be understood that gas flow 21 may be applied by nozzles of any shape, e.g., circular, rectangular, and the tip of the nozzle may be smaller than the rest of the nozzle. The relative sizes of the nozzles for gas jet 20 versus gas flow 21 may be different, e.g., the nozzle for applying the gas flow 21 may have a larger orifice than the nozzle for applying the gas jet 20. The axis position and cooling flow for the gas flow 21 depend, at least in part, on the welding speed and the laser power used.

Referring briefly to FIG. 9, an example method of the welding method previously described in reference to FIGS. 1 through 4 is depicted by a flow chart 100. Box 102 represents the method step of focusing energy 16 onto a gap free lap joint (i.e., overlapping workpieces 12, 14) to weld the joint. As previously mentioned, the energy 16 and/or the workpieces 12, 14 are moved relative to one another in order to weld the entire gap free lap joint. At box 104, the method further includes displacing the vaporized material 24 from the keyhole 26 created by the welding. The vaporized material 24 is vaporized by the energy 16. As shown at box 106, in some instances the method also includes displacing the laser-induced plasma 30 from the keyhole 26. At box 108, the method yet further includes manipulating the pool 28 of molten material, as previously described. This method involves utilizing a relatively small amount of a relatively high pressure and concentrated gas to enlarge the keyhole 26.

In other examples of the present disclosure (referred to herein as cooling examples or the welding with cooling method(s)), cooling may be used with or without the gas jet 20 when welding the joint. In the welding with cooling method(s), the cooling reduces a temperature of the joint and also reduces a temperature and a volume of the vaporized material 24 that is formed from the vaporization of the constituent material 22. In particular, the pressure level of the vaporized material 24 may be controlled by modifying the temperature and the volume of the vaporized constituent material 24. It is to be understood that the cooling examples according to the present disclosure may eliminate the need for shielding gases, preheating treatments, suction devices, and/or gaps that are often used in traditional welding processes.

FIG. 10 depicts a flowchart of an example of the welding with cooling method at reference numeral 200. At box 202, the method includes welding a gap free lap joint between a first sheet 12 (i.e., workpiece 12) and a second sheet 14 (i.e., workpiece 14). The overlapping portion(s) of the sheets 12, 14 form the gap free lap joint to be welded. Welding involves focusing energy 16 onto the overlapping sheets 12, 14 (i.e., the gap free lap joint) to weld the joint. At least one of the first and second sheets 12, 14 includes, as a coating on or as a component within the base/bulk material of the sheet 12, 14, the constituent material 22 having a lower boiling point than the melting point of the bulk/base material from which the first sheet 12 or the second sheet 14 is formed. At box 204, the method further includes cooling the first sheet 12 or the second sheet 14 adjacent to the molten pool 28 to reduce the temperature of the gap free lap joint. In this way, the temperature, volume, and pressure of any vaporized material 24 of the constituent material 22 that is formed are reduced.

FIGS. 5 through 8 illustrate different examples for implementing the method set forth in FIG. 10. In some of these examples (FIGS. 5 through 7), a cooling gas jet 50 is applied to the sheet(s) 12, 14 using different rapid cooling systems. In other of these examples (FIG. 8), a heat exchanger or a heat sink is used to cool the sheet(s) 12, 14.

In examples using the cooling gas jet 50, the cooling gas jet 50 may be cold compressed air, argon, helium, carbon dioxides, nitrogen, etc., and mixtures thereof. The cooling gas jet 50 may have a temperature ranging from about −100° C. to about 25° C.

In the examples involving the cooling gas jet 50, the flow rate of the cooling gas jet 50 may depend upon the welding speed, the linear energy, the stand-off distance, and/or the thickness of the workpieces 12, 14. In general, the higher/larger the welding speed, the linear energy, the stand-off distance, and/or the thickness of the workpieces 12, 14, the higher the flow rate of the cooling gas jet 50. In an example of welding workpieces 12, 14 that are each 1.4 mm thick, a laser power may be 3,200 W, a welding speed may be 2.4 m/min., and a cooling gas flow rate may be 60 SCFH (standard cubic feet per hour).

It is to be understood that in these examples, the energy 16 for welding may be the same energy 16 previously described, and this energy 16 may be focused on the desirable weld spot 18 in a similar manner as previously described in reference to FIGS. 1A and 1B. For example, either the source of the energy 16 and/or the sheets 12, 14 may be moved relative to one another to weld the joint along the weld direction 19. In these examples, however, it is to be understood that when the source of the energy 16 is moved, any system involving gas cooling may also be moved so that the desired cooling effect is achieved. When using a heat exchanger (e.g., as shown in FIG. 8), the heat exchanger may be fixed or moved.

Figure 5:
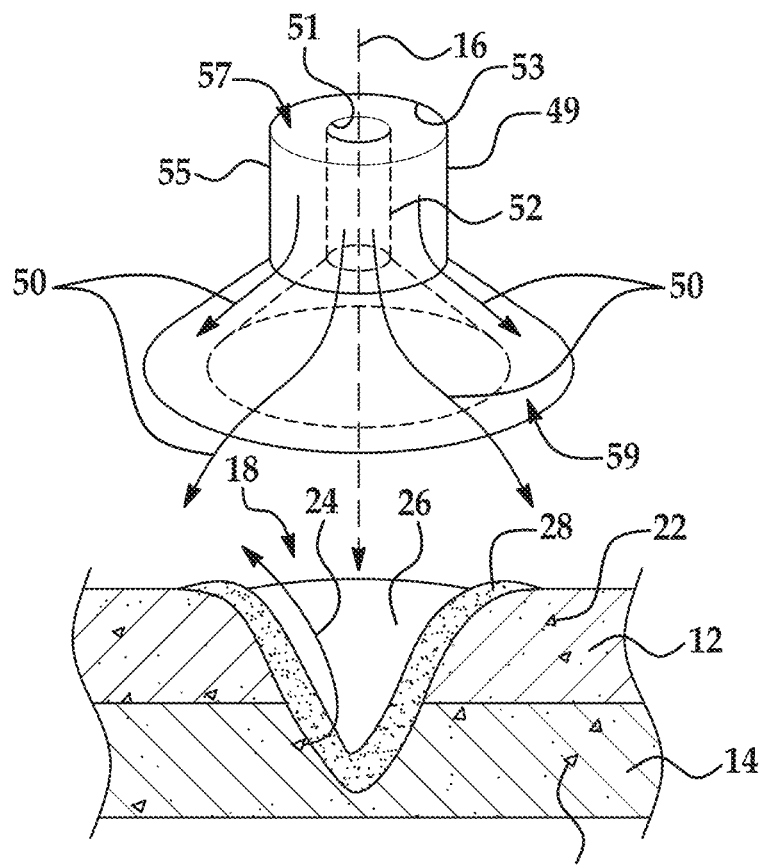
FIG. 5 is a schematic diagram depicting an example of a welding with cooling method according to the present disclosure, the diagram illustrating a partial perspective view of a rapid cooling system and a cut-away, cross-sectional view of two sheets receiving a cooling gas jet from the rapid cooling system.

Referring now to FIG. 5, cooling during the welding process may be accomplished with the rapid cooling system 49, which delivers the energy 16 through a central bore 51 and delivers the cooling gas jet 50 through an area 53 surrounding the central bore 51. In this example, the area 53 is defined between an outer wall 55 and an inner deflector 52. The area 53 has an inlet 57 and an outlet 59, and the cooling gas jet 50 is directed into the inlet 57 from some cooling gas source (not shown) through the area 53 and out of the outlet 59 toward the sheets 12, 14. In the example shown in FIG. 5, the rapid cooling system 49 is configured so that the cooling gas jet 50 is initially coaxially aligned with the energy direction of the energy 16, but then is redirected so as to substantially avoid entry of the cooling gas jet 50 into the keyhole 26 (where the energy 16 is focused). As depicted, the rapid cooling system 49 is designed to deliver the cooling gas jet 50 circumferentially around the weld site 18 so that the cooling gas jet 50 is applied to the sheets/workpieces 12, 14 rather than to the keyhole 26. For example, the rapid cooling system 49, including the area 53, may have a frustoconical shape to direct the cooling gas jet around the keyhole 26.

Using the system 49 shown in FIG. 5, the cooling gas jet 50 is applied to the sheet(s) 12, 14 around the keyhole 26 to cool the constituent material 22 within the sheets 12, 14. As noted above, the constituent material 22 may also be present as a coating on one or both surfaces of the sheet(s) 12, 14. While some vaporized material 24 is formed as a result of welding, the cooling reduces the pressure of the vaporized material 24 by a corresponding reduction in temperature of the liquid metal in the molten pool 28. This temperature reduction contributes to increasing the viscosity of the molten material in the pool 28 that forms during welding and stabilizing the molten material pool 28.

Figure 6:
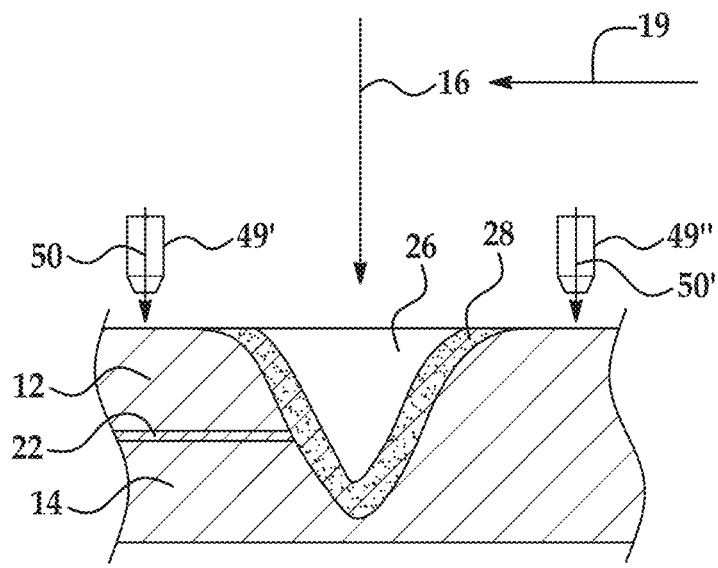
FIG. 6 is a schematic, cut-away, cross-sectional view of another example of the welding with cooling method according to the present disclosure.

In another cooling example, the cooling gas jet 50 may be applied to the first sheet 12 or the second sheet 14 in front of the molten pool 28 relative to the weld direction 19. In this example, the rapid cooling system 49' (see FIG. 6) is capable of delivering the cooling gas jet 50 so that the direction of the cooling gas jet 50 is parallel to the direction of the energy 16, and so that the cooling gas jet 50 is directed to the sheet(s) 12, 14 in front of the molten pool 28. In FIG. 6, welding is being accomplished from right to left across the page, and thus the cooling gas jet 50 is applied in front of the molten pool 28. This cooling gas jet 50 may be used alone, or in combination with another cooling gas jet 50'.

FIG. 6 illustrates cooling of the sheet(s) 12, 14 both in front of and behind the molten material pool 28 relative to the weld direction 19. In particular, the cooling gas jet 50' may be applied to the first sheet 12 or the second sheet 14 behind the molten pool 28 relative to the weld direction 19 while the other cooling gas jet 50 may be applied to the first sheet 12 or the second sheet 14 in front of the molten pool 28 relative to the weld direction 19. In this example, two different rapid cooling systems 49', 49'' are utilized to deliver the respective cooling gas jets 50, 50' to the respective areas of the sheet(s) 12, 14.

In addition to the advantages noted above for cooling in front of the molten pool 28, the introduction of the cooling behind the molten pool 28 further provides the advantage of decreasing the time for the previously welded molten metal to solidify. This can lead to better quality welds. It is to be understood that various other positions and configurations of the rapid cooling systems 49', 49'' and the cooling gas jets 50, 50' may be used to reduce the temperature of the gap free lap joint, and thereby reduce the temperature of constituent material 22 and the pressure of the formed vaporized material 24.

Figure 7:
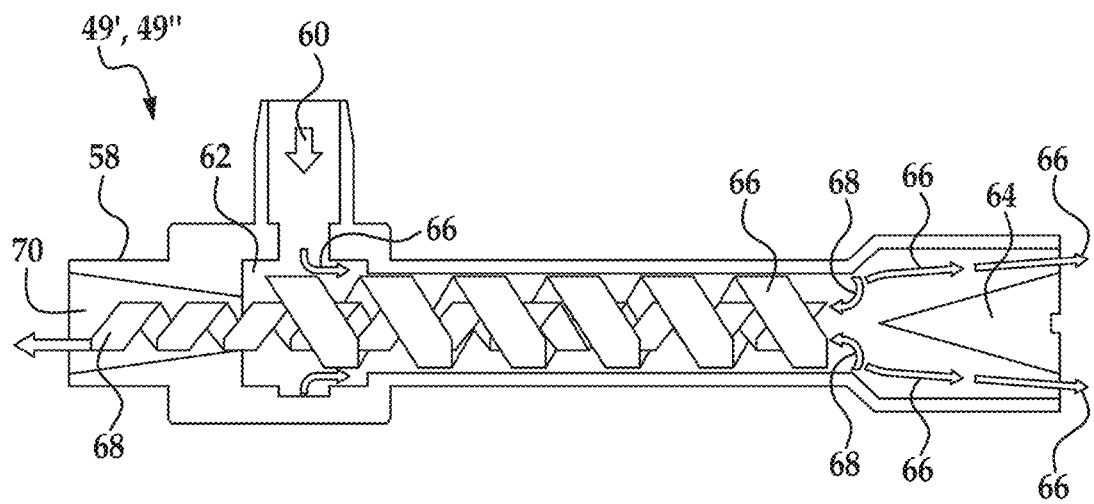
FIG. 7 is a schematic view of an example vortex tube that may be utilized in an example of the welding with cooling method.

FIG. 7 illustrates one example of the rapid cooling system 49 and 49'. This system 49, 49' includes a vortex tube 58. Generally, the vortex tube 58 includes a specially designed chamber (a swirl chamber 62) and a conical nozzle 64. A pressurized gas 60 is injected into the swirl chamber 62 at an angle tangent to the surface of the swirl chamber 62, and is accelerated to a high rate of rotation. The combination of the pressure and the internal shape of the swirl chamber 62 accelerates the gas 60 to the high rate of rotation, which may be, e.g., over 1,000,000 rpm. The gas 60 is split into two streams, one of which gives kinetic energy to the other. This separates the gas 60 into an outer vortex of a hot gas/airflow 66 and an inner vortex of a cold gas/airflow 68. The conical nozzle 64 at one end of the tube 58 allows the outer vortex of compressed gas (i.e., the hot gas/airflow 66) alone to exit from that end of the tube 58. The cooler airflow 68 is forced to return to another end 70 of the tube 58 in the inner vortex, which is within the outer vortex of the hot gas/airflow 66. The cooler gas/airflow 68 exits the vortex tube 58 at the end 70 opposite the conical nozzle 64. The system 49', 49" may be strategically positioned to achieve the cooling of the sheet(s) 12, 14 and the constituent material 22 as discussed above.

In the example shown in FIG. 7, the temperature of the cold gas/airflow 66 may depend, at least in part, on the pressure of the compressed air. Generally, the higher the pressure, the lower the temperature.

Referring now to FIG. 8, still another example of the rapid cooling system 49''' is depicted. This rapid cooling system 49''' is a heat exchanger or a heat sink and does not involve the application of the cooling gas jet 50, 50'. Rather, the heat exchanger/heat sink rapid cooling system 49''' has a coolant flowing therethrough. The coolant is introduced at an inlet (as shown at arrow 72) and exits through an outlet (as shown at arrow 74). In an example, the coolant is liquid water, but it is to be understood that various other coolants may also be used. For example, cooling air with controlled temperature and pressure may be used for the coolant.

The heat exchanger/heat sink rapid cooling system 49''' is positioned directly on the sheet/workpiece 12 or 14 around the weld spot 18. It is to be understood that the heat exchanger/heat sink rapid cooling system 49''' may be positioned on either side of the workpieces 12, 14 (i.e., on the top or on the bottom of the workpieces 12, 14). These positioning configurations enable the energy 16 to be focused to the weld spot 18, thereby allowing the molten material pool 28 and the keyhole 26 to be formed. As coolant flows through the heat exchanger rapid cooling system 49''', it cools the adjacent workpiece 12 or 14, including the constituent material 22 located therein or on surface(s) thereof. While some vaporized material 24 is formed as a result of welding, the cooling reduces the pressure of the vaporized material 24. This pressure reduction contributes to increasing the viscosity of the molten material in the pool 28, thereby stabilizing the molten material pool 28 and reducing spatter, etc.

In another example, the heat sink may be a metal plate that is placed under the workpieces 12, 14 or around the top of the weld spot 18. The metal plate is selected to have a higher heat (i.e., thermal) conductivity than the workpieces 12, 14 (e.g., zinc coated steel plates). For example, the metal plate may be a copper plate.

To further illustrate the present disclosure, examples are given herein. It is to be understood that these examples are provided for illustrative purposes and are not to be construed as limiting the scope of the present disclosure.

EXAMPLES

Comparative Example 1

Figure 11A:
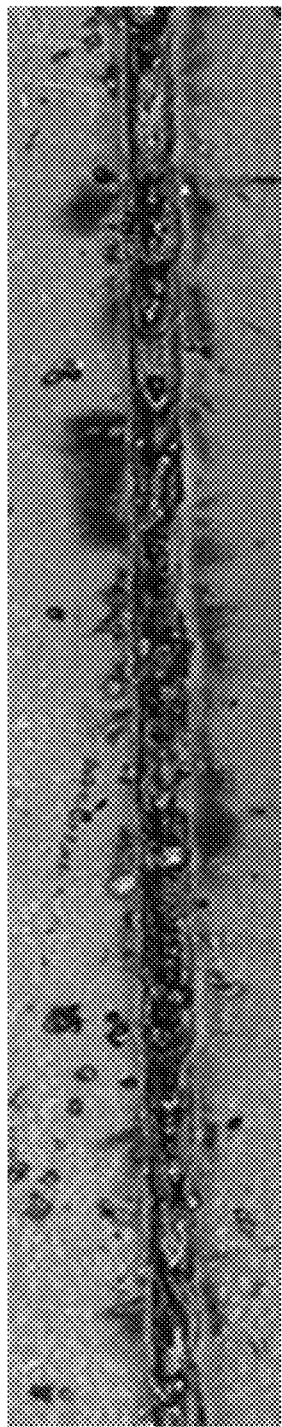
FIG. 11A is a black and white photomicrograph of an originally colored photograph of a comparative test weld formed via a traditional laser welding process.

FIG. 11A depicts a black and white photomicrograph of an originally colored photograph of a comparative test weld formed via a traditional laser welding process. In this comparative example, a 1.2 mm thick sheet and a 1.5 mm thick sheet, both of DP 980 steel, were used as the workpieces. The sheets overlapped one another with substantially no gap therebetween. The laser power was 3500 W at a focus point of 0.6 mm. The weld speed was 2.4 m/min. Pure argon shielding gas was used at a flow rate of 30 SCFH (standard cubic feet per hour). The inner diameter of the nozzle used to apply the shielding gas was 10 mm and had a cylindrical shape. The results of the welding process showed spattering on the surface of the workpiece and many blowholes in the weldline.

Example 2

Figure 11B:
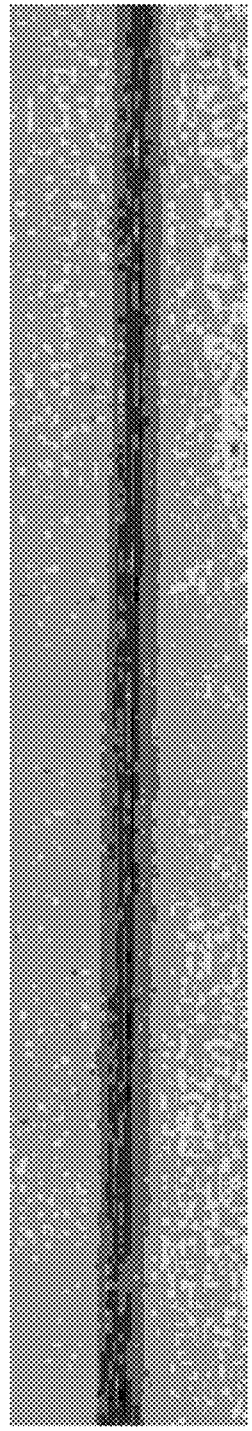
FIG. 11B is a black and white photomicrograph of an originally colored photograph of a first example test weld formed via a method according to the present disclosure.

FIG. 11B depicts a black and white photomicrograph of an originally colored photograph of a first example test weld. The first example test weld was formed via a welding method according to the present disclosure. The welding method used in this example was representative of the method described in reference to FIGS. 1-4 above. Two 1.6 mm thick sheets of DP 980 steel were used as the workpieces, and the workpieces were configured with substantially no gap therebetween. A laser with power of 3200 W and a focus point of 0.6 mm were used. The weld speed was 3 m/min. Pure argon gas was used for the gas jet 20 at a flow rate of 30 SCFH (standard cubic feet per hour). The inner diameter of the nozzle used to apply the argon gas was smaller than the nozzle used in Comparative Example 1 and had a cylindrical shape. The results showed substantially no spattering on the surface of the workpiece and substantially no blowholes in the weldline. In addition, while not shown, the results indicated that the coating on the back side of the workpieces remained intact after welding was complete.

Unlike Comparative Example 1, this method provides an enlarged keyhole to vent out the zinc vapor. Using the method of Comparative Example 1, the coupling of laser power into the workpieces 12, 14 was lower than with this method. Further, the keyhole fluctuates over a larger range using the method of Comparative Example 1 in comparison to using this method. At least for these reasons, the results of the first example test weld (i.e., Example 2) are shown to be improved in comparison to the results of Comparative Example 1. Furthermore, the method of Example 2 provided full penetration of the weld whereas the method of Comparative Example 1 provided only partial penetration. As depicted in FIGS. 11A and 11B, a large amount of spatter and blowholes are observed in Comparative Example 1, while no spatter or blowholes are observed in Example 2.

Example 3

Figure 11C:
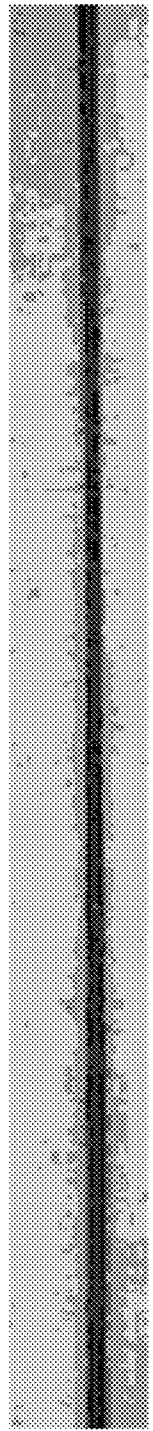
FIG. 11C is a black and white photomicrograph of an originally colored photograph of a second example test weld formed via a welding with cooling method according to the present disclosure.

FIG. 11C depicts a black and white photomicrograph of an originally colored photograph of a second example test weld. The second example test weld was formed via a welding with cooling method according to the present disclosure. The welding with cooling method used is representative of the method described in reference to FIGS. 5-8 above. Two 1.4 mm thick sheets of DP 590 steel were used as the workpieces, and the workpieces were configured with substantially no gap therebetween. A laser with power of 3200 W and a focus point of 0.6 mm was used. The weld speed was 2.4 m/min. No shielding gas was used, but rather cooling was accomplished by applying cooling gas on the workpieces 12, 14 in front of the molten pool and the keyhole. The results showed substantially no spattering on the surface of the workpiece and substantially no blowholes in the weldline.

It is to be understood use of the words "a" and "an" and other singular referents may include plural as well, both in the specification and claims, unless the context clearly indicates otherwise.

It is to be understood that the ranges provided herein include the stated range and any value or sub-range within the stated range. For example, a range from about −100° C. to about 25° C. should be interpreted to include not only the explicitly recited limits of about −100° C. to about 25° C., but also to include individual values, such as −80° C., 0° C., 4° C., etc., and sub-ranges, such as from about −100° C. to about 0° C., from about 10° C. to about 15° C., etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. A method of welding a joint between two workpieces, the method comprising:
   focusing energy onto the joint to weld the joint, the focus of the energy moving relative to the joint;
   vaporizing, by the energy, a zinc or magnesium constituent of any of the two workpieces;
   directing a gas jet, separate from the source of energy, toward a keyhole created by the welding;
   moving the zinc or magnesium vapor, using the gas jet, away from the keyhole;
   forming a pool of molten material adjacent the keyhole during operation of the energy at the joint; and
   pushing, using the gas jet, a portion of the molten material from a near end of the pool and from lateral sides of the pool to a far end of the pool, the far end being distal to the near end wherein the near end of the pool is an end that is closest to the keyhole.

2. The method as defined in claim 1 wherein the energy is chosen from a laser beam, an electron beam, and an arc.

3. The method as defined in claim 1 wherein the zinc or magnesium constituent has a lower boiling point than a melting point of a base material from which the any of the two workpieces is formed.

4. The method as defined in claim 1 wherein the gas jet is applied to the pool of molten material along a nozzle axis at an angle defined from a line parallel to a direction of the energy, the angle ranging from about 0 degrees to about 90 degrees.

5. The method as defined in claim 1 wherein the gas jet is applied to the pool of molten material along a flow axis coincident with a leading axis of the keyhole.

6. The method as defined in claim 1 wherein the gas jet is formed by a nozzle having an inlet orifice and an outlet orifice, the inlet orifice and the outlet orifice each having a respective equivalent diameter ranging from about 0.1 mm to about 200 mm.

7. The method as defined in claim 1, further comprising applying the gas jet at a flow rate determined in response to a linear energy, a nozzle axis angle, a welding speed, a stand-off distance, or an energy angle.

8. The method as defined in claim 2 wherein the energy is a laser beam and the method further comprises applying a gas jet to displace a laser-induced plasma from the keyhole, the laser-induced plasma formed by ionization of material in the joint by the laser beam.

9. The method as defined in claim 3 wherein the zinc or magnesium constituent is a coating disposed on a surface of any of the two workpieces.

10. The method as defined in claim 5 wherein the gas jet is formed by a nozzle having a nozzle wall defining a cylindrical conduit with an axial length of about 26 mm from an inlet orifice of the nozzle to an outlet orifice of the nozzle.

* * * * *